N. L. OLSON.
TRACTOR.
APPLICATION FILED SEPT. 7, 1917.

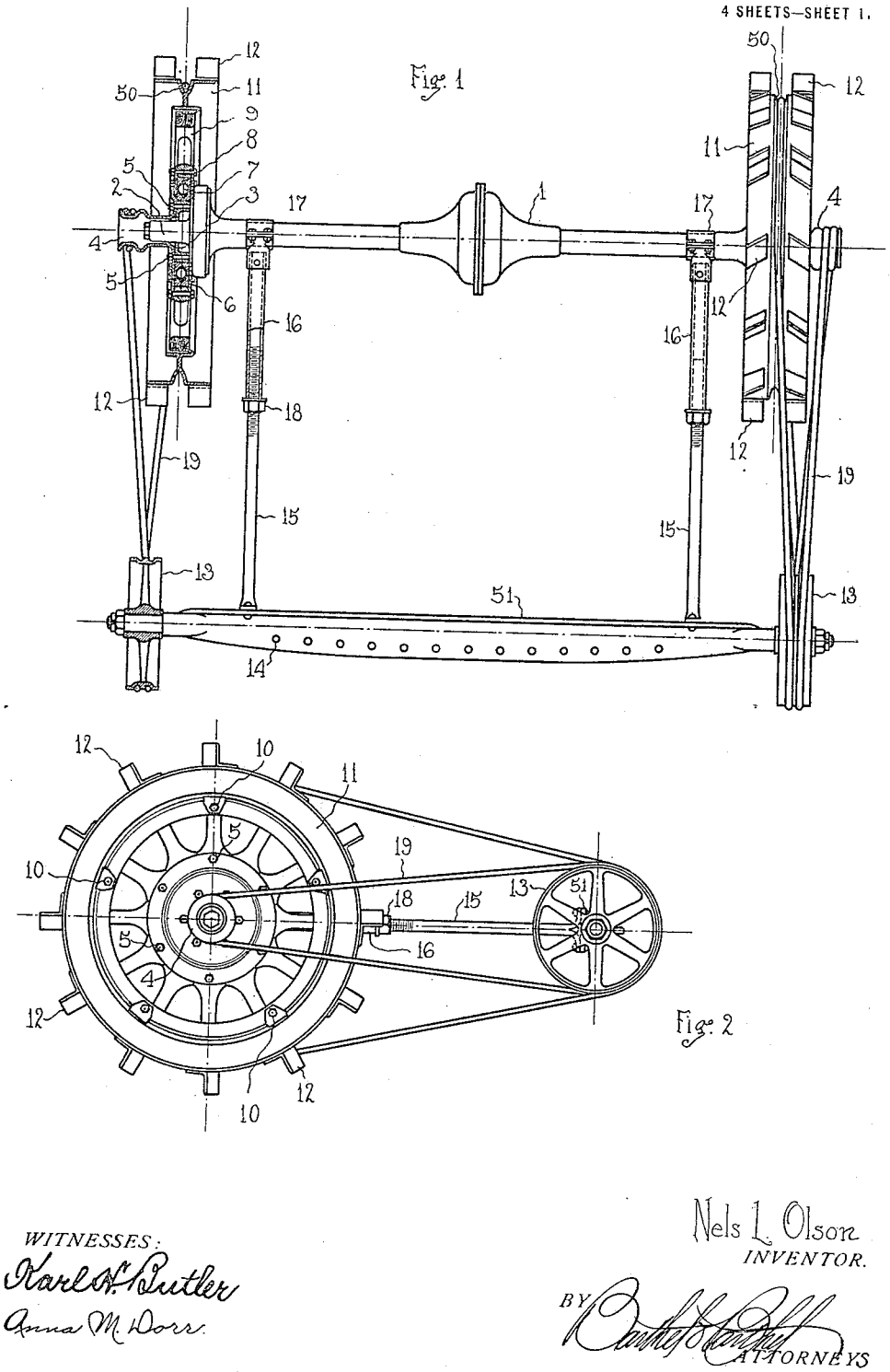

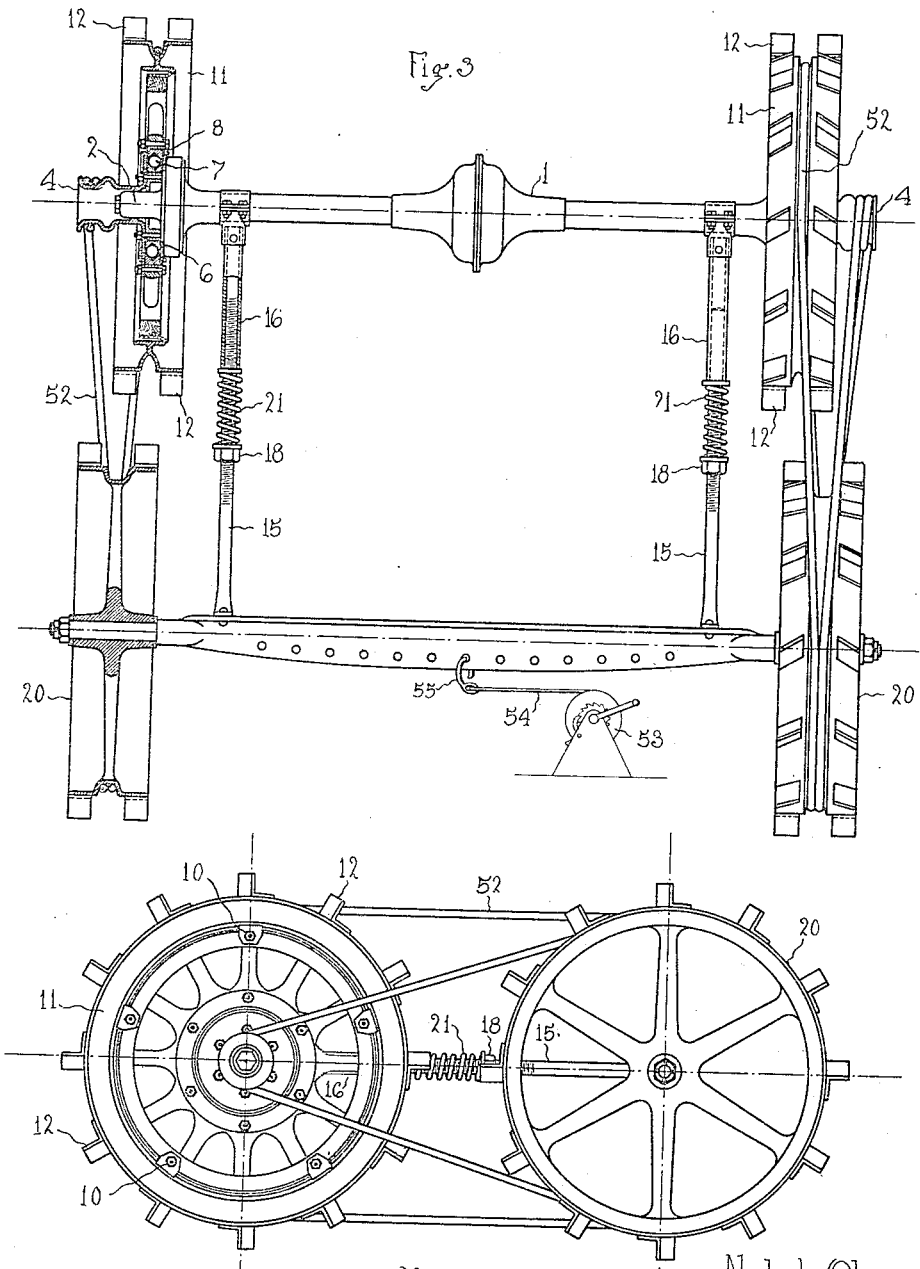

1,276,949.

Patented Aug. 27, 1918.
4 SHEETS—SHEET 3.

WITNESSES:
Kare H. Butler
Anna M. Dorr.

Nels L. Olson
INVENTOR.

BY
ATTORNEYS

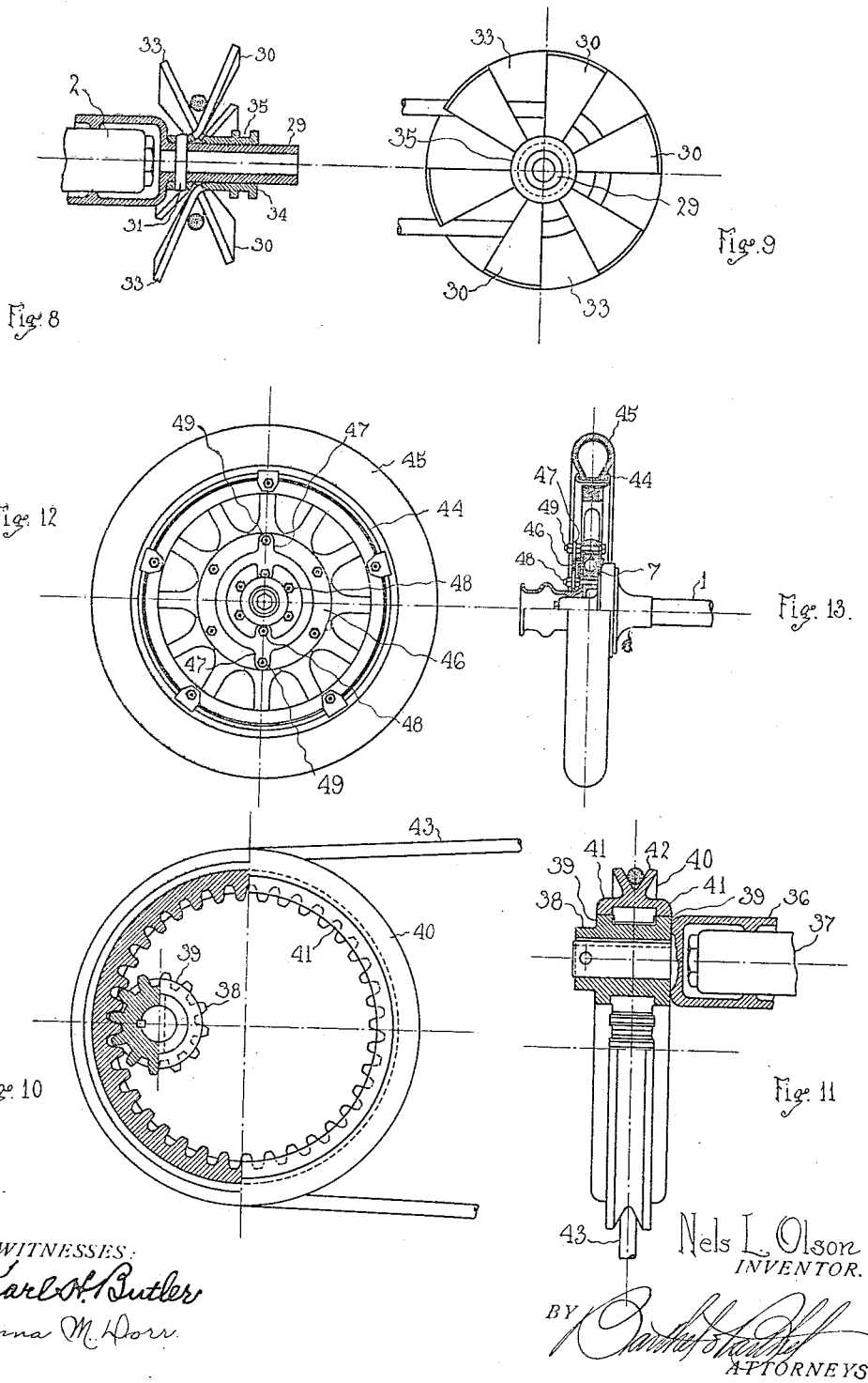

UNITED STATES PATENT OFFICE.

NELS L. OLSON, OF DETROIT, MICHIGAN.

TRACTOR.

1,276,949. Specification of Letters Patent. Patented Aug. 27, 1918.

Application filed September 7, 1917. Serial No. 190,259.

*To all whom it may concern:*

Be it known that I, NELS L. OLSON, a citizen of the United States of America, residing at Detroit, in the county of Wayne and State of Michigan, have invented certain new and useful Improvements in Tractors, of which the following is a specification, reference being had therein to the accompanying drawings.

In the automobile industry, attachments of various devices have been devised for converting a pleasure vehicle into a tractor or truck for commercial purposes, but in each instance, the attachment or device is designed for a special make or type of pleasure car and no attachment or device can be used with any make of car. To provide a universal attachment or device applicable to any make of pleasure vehicle is the main object of my invention.

Another object of my invention is to provide an attachment for transforming a pleasure vehicle into a truck or tractor that utilizes cables and grooved pulleys in lieu of gearing or chains, and provision is made for maintaining the cables taut for transmitting power, and yet allow the cables to yield when obstacles are encountered or for any inequalities between the power plant and the load.

A further object of my invention is to provide an attachment of the above character which, besides converting a pleasure vehicle into a commercial truck or tractor, permits of the pleasure vehicle being transformed into a six wheel heavy duty tractor or the power plant of the pleasure vehicle utilized for operating various kinds of stationary farm machinery.

All of the above objects are attained by a novel mechanical construction possessing many advantages that will be apparent as the invention is better understood, and reference will now be had to the drawings, wherein—

Figure 1 is a plan of the attachment partly in section;

Fig. 2 is a side elevation of the same;

Fig. 3 is a plan of the attachment having auxiliary tractor wheels for heavy duty;

Fig. 4 is a side elevation of the same;

Fig. 8 is a longitudinal sectional view of a variable speed pulley;

Fig. 9 is a side elevation of the same;

Figs. 10 and 11 are views illustrating a modification of my invention, and

Figs. 12 and 13 are views of portions of the attachment as used for pleasure purposes.

Figure 5:
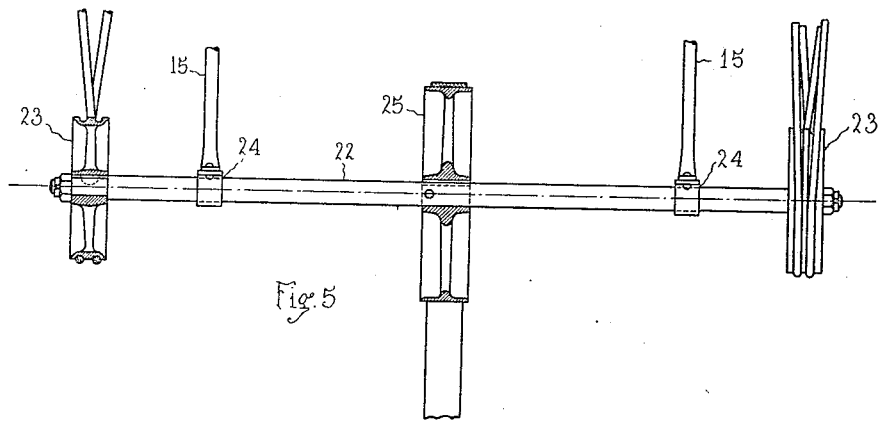
Fig. 5 is a plan of a work shaft that may form part of the attachment.
Figure 6:
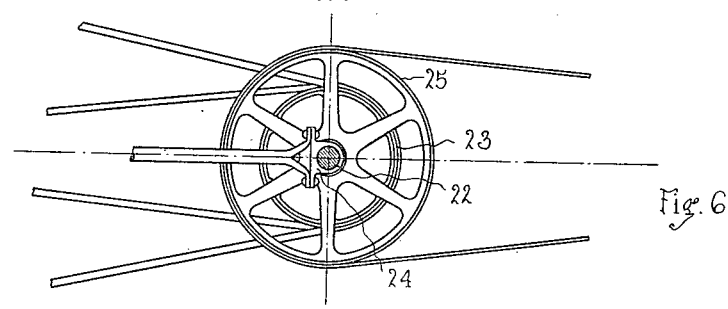
Fig. 6 is a side elevation of the same.

In describing my invention by aid of the views above referred to, I desire to point out that the same are intended as merely illustrative of an example by which my invention may be put in practice, and I do not care to confine myself to the precise construction and arrangement of parts shown. The following description is therefore to be broadly construed as including such construction and arrangement of parts which are the obvious equivalent of those to be hereinafter referred to.

Reference will first be had in Figs. 1 and 2 showing the attachment by which a pleasure vehicle may be transformed into a light duty tractor. In these views, the reference numeral 1 denotes the usual rear axle housing of a pleasure vehicle and the usual wheels have been removed leaving the bared ends of the live axle 2. On each end of the live axle 2 is mounted a ring 3 and connected thereto by bolts 5 or other fastening means is a small cable pulley 4. On the ring 3 is pressed or otherwise fitted the inner ball race 6 of an anti-frictional bearing having balls 7, and the elements 2 to 6 inclusive form the inner parts of a tractor wheel and are adapted to revolve at axle speed. The outer part of the tractor wheel includes an outer ball race 8 and a wood or wire wheel 9 of standard diameter, said wheel having the usual rim for a tire or other structure. Detachably connected to the rim of the wheel 9 by rim bolts 10, wedges or other fastening means, is a tractor rim 11 having tread members or spuds 12. The tractor wheel rim is formed with a cable groove 50, and as shown, said rim is somewhat Y-shaped in cross section, the cable groove centrally of the rim and between circumferentially disposed rows of the spuds 12. The wheel 9 and its tractor rim are free to revolve on the anti-frictional bearing 7, independent of the live axle 2, and to transmit power to the tractor wheel from the live axle 2, there is a dead axle or draw bar 51 in the rear of rear axle housing 1. The dead axle or draw bar 51 has the ends thereof provided with loose cable pulleys 13 and throughout the length of the draw bar are openings 14 so that various types of farm implements can be readily attached to the draw bar. The draw bar 51 is supported relative to the rear axle housing 1 by threaded bolts 15 extending into a tube 16 clamped on the rear axle housing 1, as at 17, said bolts having nuts 18 which may be adjusted to extend the bolts 15 relative to the tubes 16, said bolts and tubes constituting radius rods for supporting the draw bar 51, also means for maintaining cables 19 taut that are trained about the loose pulleys 13, the fixed pulleys 4 and the tractor wheels 11. Each cable is endless and is trained around the small pulley 4, then around the loose pulley 13, and then around the tractor wheel back to the loose pulley 13 and the drive pulley 4. In this manner, the tractor wheels are driven in the same direction as the small drive pulleys 4 on the drive axle 2, but the rotative movement of the tractor wheels is considerably reduced relative to the speed of the rear axle, the reduction being in the same proportion as the ratio of the respective diameters of the drive pulleys and the tractor wheels, which is about one to ten. The diameter of the loose pulley 13 is immaterial as this pulley has no action on the speed of the tractor wheel and is simply used to support the power transmitting cable. To tighten these cables, it is only necessary to adjust the nuts 18 to shift the draw bar 51 away from the rear axle housing 1, and in this manner power from the rear live axle 2 may be positively transmitted to the tractor wheels.

When it is desired to increase the traction of the wheels 11 or provide a tractor for heavy duty work, the loose cable pulleys will be replaced by plain tractor wheels 20 of exactly the same diameter as the wheels 11 and the tractor wheels 20 have grooves for power transmitting cables. This is shown in Figs. 3 and 4 and the cables 52 are trained about small driving pulleys 4 to the rear tractor wheels 20, then to the front tractor wheels 11 then back to the rear wheels 20, and then to the small driving pulleys 4. With this arrangement, self-adjusting radius rods are used; springs 21 being interposed between the nuts 18 and the ends of the tubes 16. Should a stone accidentally lodge between the cable 52 and one of the tractor wheels, the radius rods automatically yield and no undue strain is placed on the cables. If the stiff or rigid radius rod were used, there would be a possibility of the cable being stretched to a breaking point in case a large obstruction were encountered, and by adjusting the nuts 18 on the radius rod, the necessary tension is maintained in connection with the power transmitting cables 52. In this construction the traction is double that available in the attachment shown in Figs. 1 and 2 and this traction may be increased to a desired point by loading the rear axle and draw bar to increase the tractive pressure of the wheels on the ground.

In the attachment shown in Figs. 1 and 2, the original rear axle differential is brought into play when rounding a curve, the same as on a pleasure vehicle; but when it is desired to turn with the attachment shown in Figs. 3 and 4, it becomes necessary to raise the rear tractor wheels from the ground, as otherwise it would be impossible to effect turning without sliding some of the wheels. For this purpose, a small manually operated drum 53 may be placed contiguous to the operator's seat of the tractor and attached to said drum and wound thereon is a cable 54. The cable 54 may be trained over suitable sheaves to reach the draw bar and said cable has a hook 55 attached centrally of the draw bar, so that said draw bar and rear tractor wheels can be elevated a few inches when turning takes place.

The attachment shown in Figs. 1 and 2 may be used as a stationary engine for operating saws, threshing machines or other kinds of farm machinery, by substituting a live shaft 22 for the draw bar 51. The radius rods are provided with bearings 24 for the shaft 22 and cable pulleys 23 are keyed or otherwise fixed on the ends of the shaft 22, so that said shaft may be driven from the pulleys 4 of the live axle 2. A large belt wheel 25 may be fixed on the shaft 22 and by varying the sizes of the pulleys or wheels 23 and 25, it is possible to obtain any necessary speed for operating a machine. If a low speed shaft 22 is desired, the power may be transmitted from the small drive pulleys 4 on the live axle 2, or, if a high speed is necessary, the tractor wheels 11 can be locked to the rear axle and be driven at axle speed, as hereinafter explained, and the drive taken from the large wheels 11 directly to the pulleys 23, thereby obtaining a higher speed. It is also possible to mount various sizes of belt wheels on the shaft 22 or to substitute a cone pulley for the belt wheel 25 so that different speeds for different kinds of machinery may be obtained by simply shifting the belt.

Figure 7:
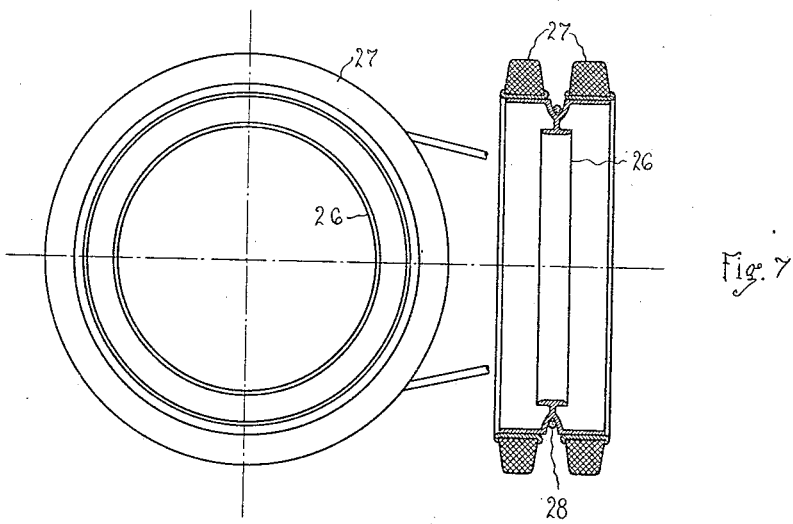
Fig. 7 shows views of a truck wheel that may form part of the attachment.

The original attachment shown in Figs. 1 and 2 permits of a pleasure vehicle being converted into a truck. The demountable tractor rims 11 may be taken off and replaced by truck wheels as shown in Fig. 7.

These truck wheels have standard inner rims 26 which may be bolted or otherwise secured on the wheels 9, and each truck wheel has solid tires 27, for use on pavements, and cable grooves 28, between the tires 27, for power transmission cables. The truck wheel rims are somewhat similar to the tractor wheel rims, only of sufficient width to accommodate the tires 27.

In the different attachments, so far described, the small driving pulley 4 has been shown with a fixed diameter. If it is desired to vary the speed of the transmission, the pulley 4 is replaced by a variable diameter pulley, as shown in Figs. 8 and 9. This variable diameter pulley has a hub 29 which is connected to the rear axle by means of the bolts 5 in place of the original pulley 4. Riveted or otherwise secured to the hub 29, as at 31, is a hub portion of a plurality of angularly disposed wings or arms 30 constituting half of the variable diameter pulley, and extending between the wings or arms 30 are angularly disposed wings or arms 33 having a hub portion 35 slidable on the hub 29, the wings or arms 33 constituting a movable half of the pulley. The hub 35 may be shifted by a forked lever or other means not shown, and the arms 30 and 33 coöperate in forming a V shaped groove the diameter of which may be varied, and consequently the linear speed of a cable placed in the groove of the pulley.

A driving arrangement that obviates the necessity of excessively bending a cable or lapping it a number of times around a small driving pulley, is shown in Figs. 10 and 11 and this driving arrangement will materially prolong the life or usefulness of a cable. The reference numeral 36 denotes a member adapted for rotation with a live axle 37 and the member 36 has a stud on which is keyed or otherwise fixed a driving pinion 38 provided with peripheral flanges 39. Meshing with the driving pinion 38 is an internal gear 40 of larger diameter, said internal gear having peripheral flanges 42 providing a groove for a cable 43. The internal gear is provided with flanges 41 and the drive positively transmitted, in the same direction, to the internal gear 40, which is always held tightly against the driving pinion 38 by the tension of the cable 43. The peripheral speed of the internal gear is approximately the same as that of the driving pinion and therefore the speed of the cable is practically the same as if it were wound directly around a small pulley of the same size as the driving pinion. In order that the teeth of the gears 38 and 40 do not too tightly mesh, the flanges 39 and 41 have been provided, and in operation, the flanges 39 are constantly rolling against the flanges 41, thereby holding the two gears properly spaced from each other, thus preventing any binding due to the tension of the cable 43. The flanges 39 and 41 also prevent any lateral movement of the internal gear and keep the same in constant contact with the driving pinion 38.

From the foregoing, it will be observed that I have devised novel means whereby an ordinary pleasure vehicle can be used for various purposes, and assuming that the pleasure vehicle has been in use as a tractor or truck and it is desired to again convert the same into a pleasure vehicle, it is unnecessary to install the ordinary rear wheels of the pleasure vehicle, as special locking rings 46, as shown in Figs. 12 and 13, permit of the wheels 9 being fixed relative to the axle 2. It is only necessary to remove the tractor rims 11 and substitute therefor a standard demountable rim 44 having a pneumatic tire 45. The locking ring 46 is provided with lugs 47 adapted to be held by bolts 48 in the central portion of the wheel and by bolts 49 to the outer part of the wheel. For this purpose, the bolts 48 and 49 are of greater length than the other hub bolts and with the locking rings properly connected, the two parts of the wheel are practically solid and operate as one piece, similar to an ordinary wheel. Of course, the radius rods and draw bar are removed from the axle and the vehicle can now be used for pleasure purposes.

The draw bar 51 and the shaft 22 constitute members in spaced relation to the live axle or housing thereof, and the terms "pulleys" and "wheels" associated with these members, are practically synonymous, as in each instance the pulley or wheel is driven from a fixed driving pulley.

What I claim is:—

1. The combination with a live axle, pulleys fixed thereon, wheels loose on said axle, and cables transmitting power to said wheels from said pulleys.

2. The combination with a live axle, pulleys fixed thereon, wheels loose about said axle, pulleys in spaced relation to said fixed pulleys, cables trained about all of the pulleys and wheels for imparting movement to said wheels from said axle.

3. The combination of a live axle, pulleys thereon, wheels loose to revolve about said axle, demountable rims for said wheels, and means trained on said pulleys and rims for imparting movement to said rims from said pulleys.

4. The combination of a live axle, fixed pulleys thereon, wheels loose to revolve about said axle, demountable rims for said wheels, power transmission means trained on said pulleys and rims for imparting movement to said rims and said pulleys, and means adapted for adjusting the tension of said power transmission means.

5. The combination of a live axle, fixed pulleys thereon, wheels loose to revolve about said axle, members spaced from said live axle, wheels at the ends of said members, power transmission means between said pulleys, loose wheels and last mentioned wheels so that all the wheels revolve in the same direction.

6. The combination of a live axle, fixed pulleys thereon, wheels loose to revolve about said axle, members spaced from said live axle, wheels at the ends of said members, power transmission means between said pulleys, loose wheels and last mentioned wheels, and means between said members and said live axle adapted for adjusting the tension of said power transmission means.

7. The combination with a rear axle housing, a live axle therein, fixed pulleys on the ends of said live axle, loose wheels about said pulleys, radius rods carried by said axle housing, a member supported by said radius rods and rear axle housing, and power transmission means trained on said pulleys about said loose wheels and the ends of said member.

8. The combination with a live axle, pulleys fixed thereon, wheels in spaced relation to said pulleys, wheels loose about said axle, and means transmitting power from said pulleys to said spaced wheels and back to said loose wheels so that said loose wheels are driven at a speed relative to said pulleys.

9. The combination with a live axle, wheels loose on said axle, and power transmitting means from said axle to said wheels, said transmitting means including elements in spaced relation to said axle adapted to receive power therefrom and transmit power to said loose wheels at a reduced speed relative to said axle.

In testimony whereof I affix my signature in the presence of two witnesses.

NELS L. OLSON.

Witnesses:
KARL H. BUTLER,
ANNA M. DORR.

Copies of this patent may be obtained for five cents each, by addressing the "Commissioner of Patents, Washington, D. C."